United States Patent [19]
Rondot et al.

[11] Patent Number: 4,589,821
[45] Date of Patent: May 20, 1986

[54] HIGH-HEAD MULTISTAGE PUMP-TURBINE

[75] Inventors: Jack Rondot, Meylan; Séverin Casacci, La Tronche, both of France

[73] Assignee: NEYRPIC, Grenoble, France

[21] Appl. No.: 501,736

[22] Filed: Jun. 6, 1983

[30] Foreign Application Priority Data

Jul. 1, 1982 [FR] France .................. 82 11575

[51] Int. Cl.⁴ .................................. F04D 29/10
[52] U.S. Cl. ............................. 415/111; 415/500
[58] Field of Search .............. 415/111, 112, 113, 114, 415/143, 500, 170 B, 110, 170 A, 104, 170 R; 384/99, 100

[56] References Cited

U.S. PATENT DOCUMENTS

| 2,190,670 | 2/1940 | Mann | 415/111 X |
| 2,339,186 | 1/1944 | Noble | 415/111 |
| 2,448,717 | 9/1948 | Jeffcock | 415/111 UX |
| 2,545,422 | 3/1951 | Blom | 415/170 A X |
| 3,620,639 | 11/1971 | Gaffal | 415/501 X |
| 3,671,137 | 6/1972 | Ball | 415/111 X |
| 4,285,551 | 8/1981 | Suzuki et al. | 384/100 |

FOREIGN PATENT DOCUMENTS 934364  8/1963  United Kingdom .............. 415/500

Primary Examiner—Robert E. Garrett
Assistant Examiner—Joseph M. Pitko
Attorney, Agent, or Firm—Pollock, Vande Sande & Priddy

[57] ABSTRACT

A hydrostatic bearing supplied with pressurized water positioned as a seal between the shaft of a pump-turbine and a suction bend adjacent the lower end of the shaft. The hydrostatic bearing replaces the conventional labyrinth joint usually located above the lower shaft bearing, and may additionally replace the lower bearing itself.

4 Claims, 3 Drawing Figures

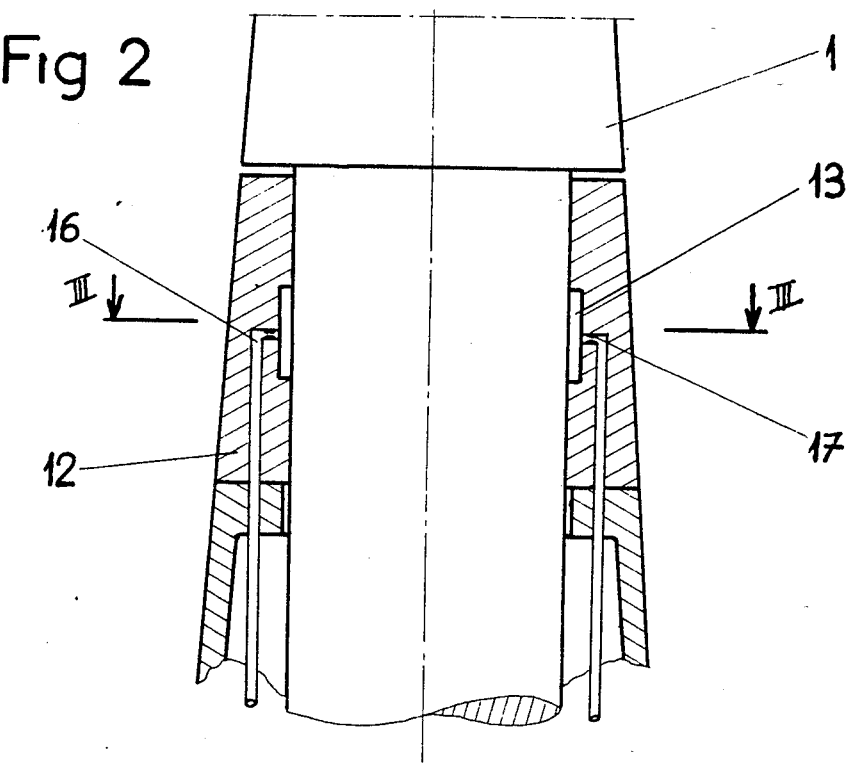
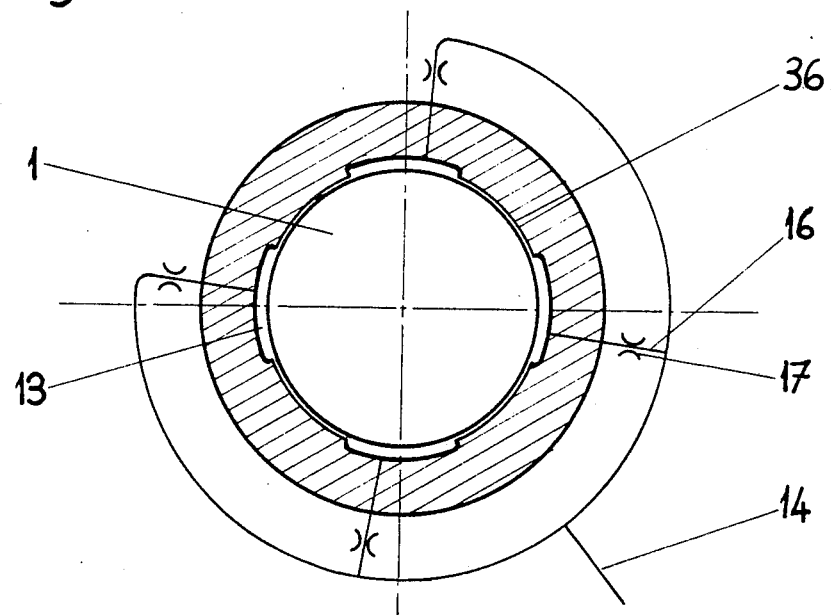

HIGH-HEAD MULTISTAGE PUMP-TURBINE

FIELD OF THE INVENTION

The present invention relates to an improvement to high-head multistage pump-turbines employed in the hydroelectric industry.

BACKGROUND OF THE INVENTION

In prior art high-head multistage pump-turbines, the rotor is mounted on two hydrodynamic bearings respectively located in the upper part and the lower part. The lower bearing is mounted on the suction bend of the turbine, a labyrinth seal being located above the latter for creating a seal between the shaft and the suction bend. This labyrinth seal involves a significant addition of the axial space requirement, resulting in a fairly significant center-to-center distance between the two bearings. During the runs in transient operation, considerable radial thrusts appear at the wheels, giving rise, because of this significant center-to-center distance, to distortions in the line of shafts. As a result, it is necessary to provide, in the region of the labyrinth seals fitted to the wheels, substantial clearances, in turn causing substantial losses through leakage and hence loss of output.

Moreover, this increase in the dynamic deflections, in both normal and transient operation, constitutes a factor in the increase of wear of the various labyrinth seals, as well as an increase of noise. To reduce this dynamic deflection it would be necessary to raise the lower hydrodynamic bearing, but this would entail an increase in the angle of the internal cone at the bend, and thus a bulkier external profile of this bend for an equal cross section of flow. Not being optimal, this new bend profile would give rise to phenomena of cavitation with attendant wear, as well as a loss of output.

SUMMARY OF THE INVENTION

The present invention makes it possible to mitigate this kind of disadvantage and hence to produce a high-head pump-turbine in which the effective center-to-center distance between the shaft support bearings is reduced to a minimum, making it possible to employ labyrinth seals with reduced clearances, and to modify the various dimensions of the machine elements in such a way as to obtain an optimum compromise between the center-to-center distance, the shaft diameter and the angle of the internal cone at the suction bend.

The high-head multistage pump-turbine according to the invention comprises, as a replacement for the seal responsible for the sealing between the shaft and the suction bend, a hydrostatic bearing supplied with water from the high-pressure duct.

BRIEF DESCRIPTION OF THE DRAWINGS

The characteristics and advantages of the invention will appear more clearly with the help of the following description of an example of embodiment, with reference to the attached drawings in which:

FIG. 2 is an enlarged view of the hydrostatic bearing positioned on the pump turbine of FIG. 1, and FIG. 3 is a sectional view along the line III—III of FIG. 2.

DETAILED DESCRIPTION

Figure 1:
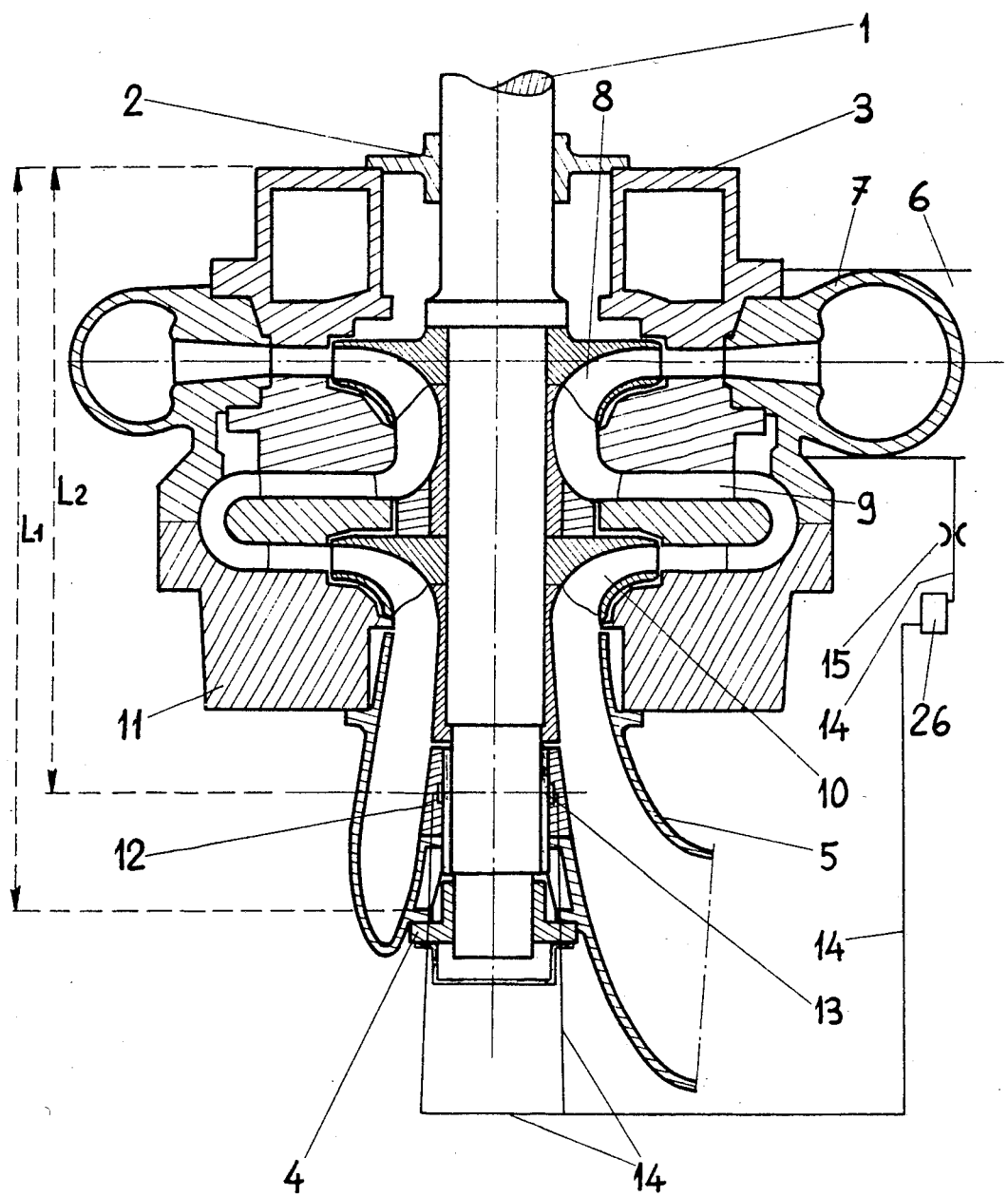
FIG. 1 is a view in axial section of a two-stage pump-turbine according to the invention.

In FIG. 1, the reference 1 designates the shaft constituting one of the essential elements of the rotor of the machine. In a conventional manner, this shaft is supported by an upper hydrodynamic bearing 2 fastened to the upper plate 3 of the machine and a lower hydrodynamic bearing 4 fastened on the suction bend 5.

Also in a conventional manner, the two-stage pump-turbine shown comprises a high-pressure duct 6, a turbine housing 7, an upper wheel 8, a return channel 9, a lower wheel 10, and a lower plate 11 bearing the suction bend 5.

According to the invention, the labyrinth seal, usually located above the lower bearing 4 and responsible for creating a seal between the suction bend 5 and the shaft 1, is replaced by a hydrostatic bearing 12 whose water pockets 13 are supplied with water under high pressure from the high-pressure duct 6 by means of channels 14. The water is routed through it to the hydrostatic bearing 12 optionally through a flow control device 15 in a case of very high head and a filter 26 in a case of water laden with impurities.

Also referring to FIGS. 2 and 3, it is seen that the hydrostatic bearing 12 comprises, in a conventional manner, a series of pockets 13. Water leaving the pockets forms a film 36 on the whole surface of the bearing. Each of the pockets 13 is connected to the general channelling of water supply 14 by individual ducts 16 each of which comprises a conventionally controlled and activated flow control device 17. In a conventional manner, the flow control devices such as 15 and 17 are each constituted by one or more perforated diaphragms of one or more calibrated orifices.

By virtue of the construction according to the invention, the effective center-to-center distance between the upper and lower bearings passes from the value L1 shown on FIG. 1 to the value L2 which is lower than L1, due to the fact that the hydrostatic bearing 12 acts not only as a seal but also as a bearing.

In the preferred embodiment which has just been described, the lower hydrodynamic bearing 4 is retained for obvious mechanical reasons. It goes without saying that, in particular in the case of small machines, bearing 4 could be omitted, and the assembly, normally consisting of this lower bearing and its associated labyrinth seal, replaced by the hydrostatic bearing 12.

We claim:

1. In a high-head multistage pump-turbine having a shaft (1) supported by an upper hydrodynamic bearing (2) and a lower bearing attached to a bend (5) and being supplied with water from a high-pressure duct (6), and comprising sealing means between said shaft and said bend (5), the improvement comprising a hydrostatic bearing (12) directly supplied with water under pressure from said high-pressure duct and acting as both a bearing and as said sealing means, and comprising water pockets for receiving said water through channel means from said high pressure duct.

2. The improvement according to claim 1, wherein said hydrostatic bearing (12) is located above said lower bearing (4).

3. The improvement according to claim 1, wherein said hydrostatic bearing (12) constitutes said lower bearing.

4. The improvement according to any one of claims 1 to 3, wherein said hydrostatic bearing comprises a plurality of pockets (13) connected via flow control means (17) to a water supply (14).

* * * * *